Figure 1:
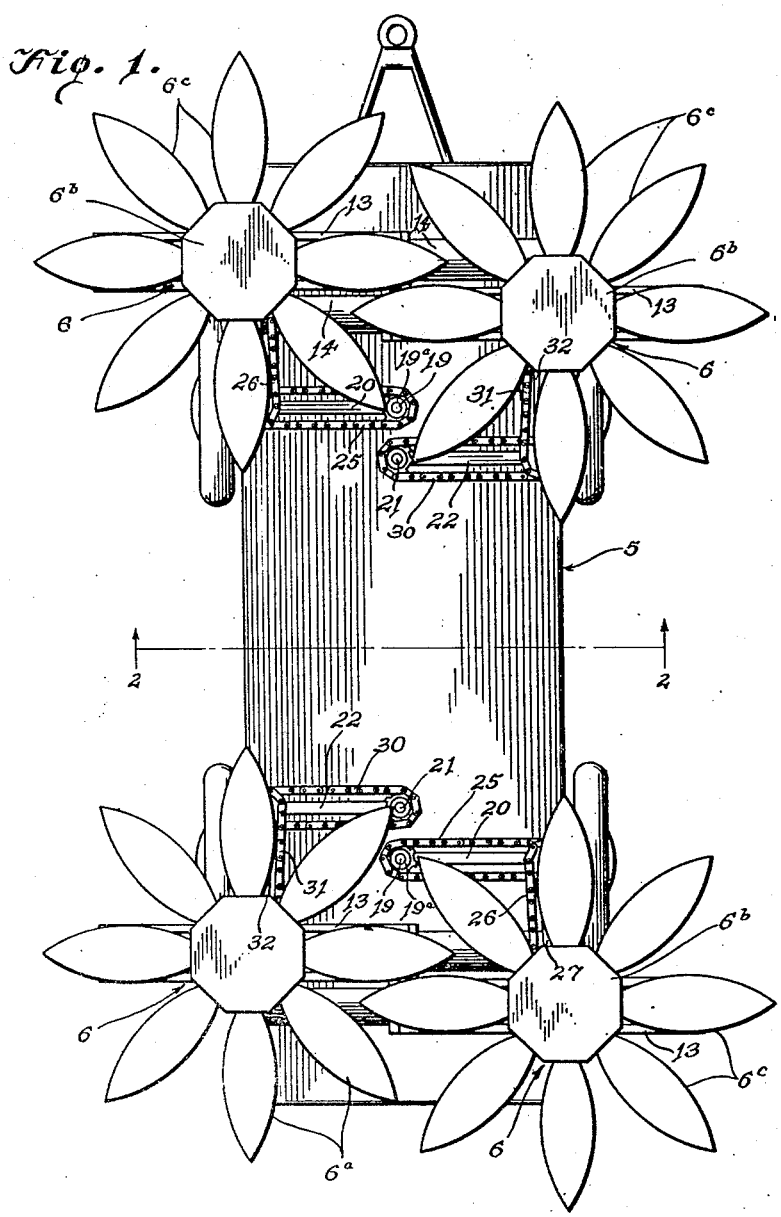

Oct. 5, 1948.  C. D. RAY  2,450,812
FRUIT PICKER

Filed Nov. 19, 1945  2 Sheets-Sheet 1

Inventor
Clinton D. Ray

By Bernard J. Garvey
Attorney

Oct. 5, 1948.   C. D. RAY   2,450,812
FRUIT PICKER
Filed Nov. 19, 1945   2 Sheets-Sheet 2
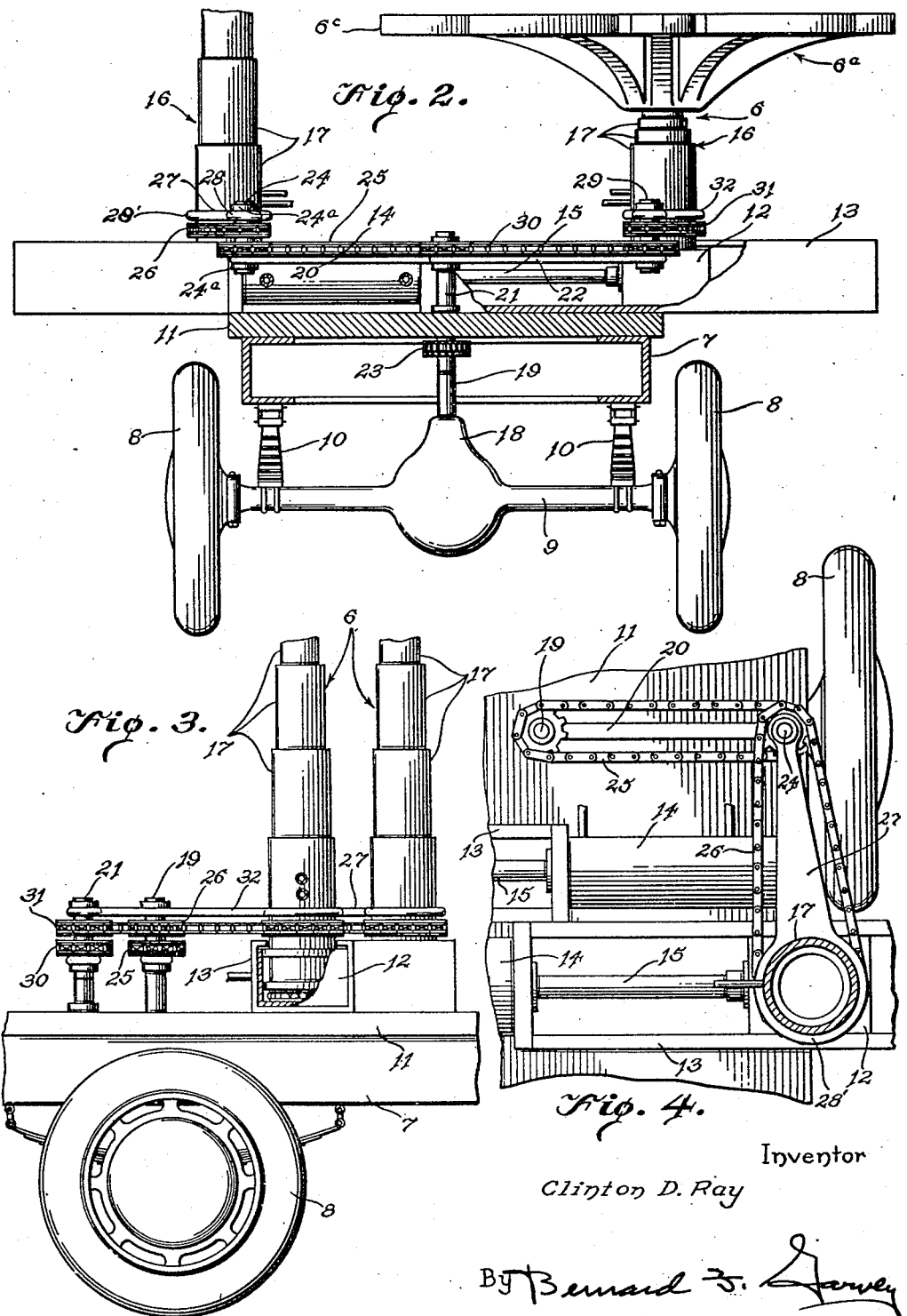
Inventor
Clinton D. Ray
By Bernard F. Garvey
Attorney Patented Oct. 5, 1948

2,450,812

UNITED STATES PATENT OFFICE 2,450,812

FRUIT PICKER

Clinton D. Ray, Mesa, Ariz.

Application November 19, 1945, Serial No. 629,400

11 Claims. (Cl. 304—9)

1

This invention relates to a staging for use, primarily, by operators engaged in picking fruit from, or pruning, trees.

An object of this invention is, generally, to improve upon such known prior art platforms as have been provided for use, in the place and stead of ladders, in gathering fruit and/or pruning trees.

The staging contemplated by this invention is of a portable or mobile type and is characterized by a revoluble work pedestal that is readily adjustable to the desired elevation, and also in a horizontal plane toward or away from the tree and is otherwise of such a construction and design as to lend itself admirably to the purpose intended.

The invention, together with the above noted and other objects and advantages will be best understood from a study of the following description taken in connection with the accompanying drawings in which is illustrated what is presently considered a preferred embodiment of the invention, and wherein;

Figure 1 is a top plan view of a staging for gathering fruit and/or pruning trees;

Figure 2 is a transverse sectional view taken substantially on line 2—2 of Figure 1, and looking in the direction of the arrows; certain parts being broken away to better illustrate certain details hereinafter more fully referred to, and with one of the work pedestals shown in fully lowered position and the standard for a second work pedestal shown fragmentarily in extended position and with the work platform thereof removed;

Figure 3 is a fragmentary side elevational view showing the transmission mechanism for revolving the individual work pedestals; and Figure 4 is a detail fragmentary sectional view taken through the right rear work pedestal looking downwardly.

Referring more in detail to the drawings, it will be seen that generally the staging is composed of a mobile staging platform 5 on which are mounted one or more, in the present instance four work pedestals 6.

The mobile platform 5 is preferably in the form of a trailer to be hitched to a suitable draft animal or vehicle to be drawn thereby alongside of the tree or between rows of trees as so usually arranged in an orchard. Each work pedestal 6 is adjustable as to height and is rotatable in a horizontal plane on a vertical axis that is shiftable horizontally relative to the mobile platform 5. Thus, and as will become more evident as the description proceeds, the entire arrangement of the staging is such as to lend itself admirably to the employment thereof in picking fruit from, and/or pruning, trees as well among the branches at the middle part, as from the outside of the

2 tree, and, within reason, regardless of the height of the tree.

Mobile platform 5 broadly comprises chassis frame 7, front and rear traction wheels 8, an axle housing 9 for each pair of wheels 8, suspension springs 10 for suspending each axle housing 9 from the chassis 7 and a bed 11 mounted on the chassis 7. The wheels 8 at one end of the platform 5 may be mounted in any suitable manner as to permit turning thereof either to the right or left for changing the direction of travel. Also at this end, the mobile platform may be provided with any suitable hitch means to permit hitching the platform to a draft animal or vehicle.

In the illustrated form of the invention, four work pedestals 6 are used. These work pedestals are arranged in pairs, there being preferably one pair adjacent each end of the mobile platform 5.

Since the work pedestals 6 are substantially identical in construction, a detail description of one should suffice.

Each of the pedestals 6 comprises a base member 12 that is slidably mounted in a channel member 13 secured transversely to the bed 11 of the mobile platform 5, and at one end extending laterally beyond a side edge of the bed 11 as shown to advantage in Figures 1 and 2. While any suitable means may be employed for shifting the base 12, in the present instance there is illustrated, for such purpose, a hydraulic mechanism which embodies, among other parts, a cylinder 14 disposed within the channel guide 13 at one end of the latter. Mounted for reciprocation within the cylinder 14 is the usual pressure responsive piston (not shown). The rod 15 of the piston is rigidly connected to the sliding base 12 so that shifting movement of the piston is transmitted to the base 12 for moving the latter to any desired position of lateral adjustment relative to the bed 11.

Mounted on, and rising from, the base 12, is a standard 16. In the present instance the standard is shown as being composed of a plurality of telescoping sections 17 that are adapted, through the medium of suitable hydraulic mechanism and in any well known conventional manner, to be extended or retracted for moving to a desired position of vertical adjustment or elevation, an operator's platform 6a. Platform 6a is mounted on and secured to the standard 16 in any suitable and conventional manner.

The standard 16 is mounted on the base 12 in a manner shown in Figure 3 and as will permit rotation of the standard relative to the base. Platform 6a is also characterized by being constructed with a center supporting surface 6b of material dimensions and a circular series of braced surface extensions 6c spaced equi-distantly apart and radiating from the center 6b as shown to advantage in Figure 1.

From the foregoing it will be seen that each work pedestal 6 is capable of being positioned at the desired position of adjustment laterally with respect to the staging platform 5 and as may be necessary to cause the platform extensions 6c to extend inward between the branches of a tree. Thus the person standing on the platform is enabled to reach any portion of a tree branch without undue effort and in comparative safety. Also by reason of the work pedestal 6 being adjustable as to height, the picking and/or pruning operation may be carried on with facility at the middle part as well as from the outside of the tree and/or between adjacent trees and regardless of the height of the tree or trees.

While it is within the contemplation of this invention to have the individual work pedestals 6 mounted so as to revolve freely by reason of the platform extensions 6c engaging the branches of the trees to effect purchase therefor as the staging platform moves either around the tree or from one tree to an adjacent tree, there is illustrated herein means for positively driving the pedestals 6 as the mobile platform 5 moves over the ground.

In the illustrated embodiment of the invention, each pair of traction wheels 8 is in driving connection with the two revolving work pedestals at the corresponding end of the mobile platform 5. To this end each pair of traction wheels 8 has associated therewith, and in a conventional manner, a differential gear assembly (not shown), the housing for which is designated generally at 18. From this housing extends vertically a short drive shaft 19. Suitably supported by the bed 11, and in proximity to the shaft 19, is a short vertical shaft 21. A chain and sprocket connection 23 connects shafts 19 and 21 for transmitting drive from the former to the latter shaft.

For transmitting drive from the shaft 19 to the standard 16 of one of the aforementioned pair of work pedestals 6, there is provided a chain and sprocket drive mechanism now to be described. This mechanism consists of a floating jack shaft 24 that is supported by, and forms a pivotal connection between, the adjacent ends of stretch brackets 20 and 27. At their adjacent ends, stretch brackets 20 and 27 are provided with eyes to accommodate the jack shaft 24 that, as shown to advantage in Figure 2, is provided adjacent its upper and lower ends with collars 24a. At the end thereof remote from jack shaft 24, bracket 20 is provided with an eye through which the upper end of shaft 19 extends. At said end, shaft 19 is provided with spaced collars 19a that accommodate therebetween the last mentioned end of bracket 20. Bracket 27 is provided at one end thereof with an eye 28 for accommodating the jack shaft 24 as above mentioned, and at its opposite end is provided with an eye 28' that embraces the lowermost section 17 of the mentioned pedestal standard 16. The mentioned section of the pedestal standard is provided with a suitable peripheral groove which loosely accommodates the bracket eye 28'.

Stretch bracket 20 serves to maintain in sufficiently taut condition the chain of a chain and sprocket mechanism 26 that connects shaft 24 with the mentioned pedestal standard 16.

From the foregoing, it will be apparent that I have provided a floating chain and sprocket drive connection which permits transmission of drive to the pedestal standard 16 regardless of the lateral position of adjustment of the pedestal, and which will not interfere with movement of the pedestal to the desired position of lateral adjustment.

The companion work platform 6 of each pair of such platforms is driven from shaft 19 through the aforementioned chain and sprocket drive connection 23 between shaft 19 and the aforementioned shaft 21, a chain and sprocket connection 30 between shaft 21 and a floating jack shaft 29, and a chain and sprocket mechanism 31 connecting shaft 29 with the standard 16 of the last mentioned work pedestal. Like jack shaft 24, jack shaft 29 is supported by and provides a pivotal connection between stretch brackets 22 and 32. Stretch bracket 22 serves to space the shaft 29 from shaft 21, and stretch bracket 32 serves to space the jack shaft 29 from the standard 16 of the mentioned companion work pedestal; stretch bracket 22 functioning in a manner similar to the hereinbefore described stretch bracket 20, and stretch bracket 32 functioning in a manner similar to the hereinbefore described stretch bracket 27.

From the foregoing, it is apparent that as the mobile platform 5 moves over the ground, either around an individual tree, or from one tree to an adjacent tree, drive is transmitted from the ground wheels 8 to the standards 16 so that all of the working pedestals 6 are caused to revolve simultaneously and in synchronism with the speed of travel of the mobile platform. As the work pedestals so revolve, the platform extensions 6c thereof move into and from among the branches of the trees. Manifestly, the fruit picker or tree pruner standing on a pedestal is thereby enabled to conveniently work from a platform extension 6c, reaching any portion of a tree branch conveniently and in safety to his person.

It will also be apparent that the number of workmen employed and the number of trees being worked upon, especially in an orchard, are limited only by the number of work pedestals mounted on the mobile platform.

It will also be apparent that by reason of the construction of the individual pedestal platforms 6a, a positive driving means for the pedestals may be dispensed with, the construction of the respective pedestal platforms lending itself, as will be obvious to those skilled in the art, to positive coaction with the tree branches for effecting a rotation of the pedestal as the staging moves around a tree or passes from one tree to another.

Also in using the staging, the mobile platform 5 serves as a convenient transportation vehicle for transporting the picked fruit and/or pruned tree limbs to the desired location for disposal thereof.

While I have herein shown a preferred embodiment of the invention, I am of course aware that various changes may be made within the scope of the claims hereto appended.

What I claim is:

1. A staging comprising a mobile platform and a revolvable work pedestal mounted thereon and embodying a circular series of equi-distantly spaced surface extensions adapted to be disposed among the branches of a tree and to co-act therewith to cause the pedestal to revolve as the staging travels alongside of the trees.

2. A staging comprising a mobile platform and a work pedestal revolvably mounted thereon and adjustable vertically and horizontally relative thereto; said work pedestal embodying a circular series of spaced operator-supporting extensions adapted to be projected among the branches of a tree to enable the operator to work among the branches at the middle part of the tree.

3. A staging comprising a mobile platform having a laterally-extending guide channel thereon and a vertically adjustable revolvable work pedestal mounted on the platform and embodying a base having a working fit in said guide channel.

4. A staging comprising a platform, and a revolvable work pedestal mounted thereon; said pedestal embodying a base member mounted on and shiftable over the surface of the platform, a standard mounted on and rising from said base, and a revolvable operator's platform mounted on said standard.

5. A staging comprising a platform, a base member mounted on the platform for sliding movement relative thereto, an extensible standard revolvably mounted on the base member, and an operator's platform mounted on the standard and adapted to be positioned among the branches of a tree as and for the purpose specified.

6. A staging comprising a platform, and a plurality of revolvable work pedestals mounted on the platform and individually adjustable vertically and laterally relative to one another.

7. A staging comprising a mobile platform and a plurality of vertically adjustable and revolvable work pedestals mounted thereon and respectively embodying an operator's platform having extensions for disposition among the branches of a tree, as and for the purpose specified.

8. A staging comprising a wheel-supported platform, a plurality of vertically adjustable, revolvable work pedestals mounted on the platform and individually bodily adjustable laterally relative to one another, and driving mechanisms connecting the wheels of the platforms with the pedestals for revolving the latter as the platform moves over the ground.

9. A staging comprising a wheel-supported platform, a plurality of vertically adjustable man-supporting work pedestals revolvable about a vertical axis and mounted on the platform, the axes of the revolvable pedestals being individually shiftable to desired positions of lateral adjustment on the platform, and mechanism connected with the respective pedestals for positively revolving the latter.

10. A portable staging comprising a revolvable work pedestal having surface extensions for disposition among and cooperable with the branches of a tree to enable the operator to work among the branches in the middle part of the tree and cause the pedestal to revolve as the staging travels alongside of the tree.

11. A staging comprising a wheel supported platform, a guide channel thereon, a base having a working fit in the guide channel and movable therein relative to the platform, and a work pedestal mounted on the base having surface extensions adapted to be projected among the branches of a tree.

CLINTON D. RAY.

REFERENCES CITED

The following references are of record in the file of this patent:

UNITED STATES PATENTS

| Number | Name | Date |
| --- | --- | --- |
| 368,243 | Sanders | Aug. 16, 1887 |
| 509,007 | Wadsworth | Nov. 21, 1893 |
| 872,459 | Satre | Dec. 3, 1907 |
| 882,161 | Olive | Mar. 17, 1908 |
| 969,164 | Johnstone | Sept. 6, 1910 |
| 1,337,487 | Schlatter | Apr. 20, 1920 |
| 1,362,944 | Kirby | Dec. 21, 1920 |
| 1,615,663 | Varga | Jan. 25, 1927 |
| 1,718,979 | Protzeller | July 2, 1929 |
| 1,960,355 | Tamini | May 29, 1934 |
| 2,030,650 | Miller | Feb. 11, 1936 |
| 2,069,830 | Hirschberg | Feb. 9, 1937 |
| 2,337,674 | Miller | Dec. 28, 1943 |
| 2,237,773 | Van Voorhis et al. | Apr. 8, 1941 |
| 2,384,939 | Lord | Sept. 18, 1945 |
| 2,386,881 | Phillips | Oct. 16, 1945 |
| 2,410,030 | Horni | Oct. 29, 1946 |